United States Patent [19]

Pierce et al.

[11] Patent Number: 4,585,749

[45] Date of Patent: Apr. 29, 1986

[54] PROCESS FOR THE PREPARATION OF AN OLEFIN POLYMERIZATION CATALYST

[75] Inventors: Dale E. Pierce, Bartlesville, Okla.; Jerry L. Vaughan, Hobbs, N. Mex.; Oscar D. Nowlin, Bartlesville, Okla.

[73] Assignee: Phillips Petroleum Company, Bartlesville, Okla.

[21] Appl. No.: 536,921

[22] Filed: Sep. 28, 1983

[51] Int. Cl.$^4$ .................... B01J 31/14; C08F 4/76
[52] U.S. Cl. .................... 502/107; 502/119; 502/127; 502/134; 502/104; 502/111; 526/119; 526/125; 526/127; 526/142; 526/907
[58] Field of Search .............. 526/119, 125, 128, 142, 526/127, 348; 502/107, 104, 111, 119, 127, 134; 423/164

[56] References Cited

U.S. PATENT DOCUMENTS

| 3,184,416 | 5/1965 | Mottus | 502/111 |
|---|---|---|---|
| 3,803,105 | 4/1974 | Galli et al. | 526/125 |
| 3,830,787 | 8/1974 | Susa et al. | 526/125 |
| 4,263,169 | 4/1981 | Scata et al. | 526/128 |
| 4,296,223 | 10/1981 | Berger | 526/125 |
| 4,394,291 | 7/1983 | Hawley | 526/119 |
| 4,477,588 | 10/1984 | Hawley | 526/125 |
| 4,503,159 | 3/1985 | Masino et al. | 526/125 X |
| 4,520,121 | 5/1985 | Inkrott et al. | 526/125 X |

FOREIGN PATENT DOCUMENTS 2102439  2/1983  United Kingdom .............. 526/125

*Primary Examiner*—Joseph L. Schofer
*Assistant Examiner*—Fred M. Teskin
*Attorney, Agent, or Firm*—Edward L. Bowman

[57] ABSTRACT

An olefin polymerization catalyst prepared by reacting an admixture of anhydrous magnesium dihalide and hydrous magnesium dihalide with reactants including benzoic acid ester, an alkoxytitanium compound, an organoaluminum halide, and a titanium halide.

14 Claims, No Drawings

PROCESS FOR THE PREPARATION OF AN OLEFIN POLYMERIZATION CATALYST

The present invention relates to the polymerization of olefins. In another aspect, this invention relates to novel catalysts useful for the polymerization of olefins.

U.S. Pat. No. 4,394,291 discloses a number of new high activity polymerization catalysts. The disclosure of said patent is hereby incorporated by reference. One of the catalyst types disclosed was prepared by reacting reactants comprising (a) a magnesium dihalide, (b) a benzoic acid ester, and (c) a titanium compound, such as an alkoxytitanium compound, to produce a first catalyst component, then reacting that component with a second catalyst component comprising a precipitating agent, and then reacting the resulting solid product with a halogenating agent, such as TiCl$_4$.

The catalysts of the examples in that application were prepared using commercially available "anhydrous" magnesium dichloride. The term "anhydrous" magnesium dichlorides as conventionally used is used to indicate magnesium chlorides having no more than about 1 mole of water per mole of magnesium dichloride. Typically, the level of water in commercially obtained "anhydrous" magnesium chloride is much lower than 1 mole per mole of magnesium chloride.

Another commonly assigned, subsequently filed U.S. patent application discloses that the activity of such catalysts can be improved by insuring that the magnesium dihalides have certain specified amounts of water associated therewith.

It has subsequently been noted that the addition of water to a hydrocarbon dispersion of the magnesium dihalide is inefficient for producing catalyst for most commercial scale operations since it leads to the formation of large solid agglomerates. The formation of the large solid agglomerates results in inefficient reaction of the magnesium dihalide in the later steps of the catalyst preparation and thus to lower catalyst activity. The presence of the large agglomerates also tends to cause plugging of the lines in which catalyst is generally transferred in modern commercial scale polymerization processes.

SUMMARY OF THE INVENTION

The present invention provides an improved catalyst, the method for its production, and the method for its use.

In accordance with the present invention, the catalyst is produced by reacting an admixture of anhydrous magnesium dihalide and hydrous magnesium dihalide with reactants comprising a benzoic acid ester and an alkoxytitanium compound to form a first catalyst component, and then reacting said first catalyst component with an organoaluminum halide to form a solid product, then reacting that solid product with a halogenating agent comprising a titanium halide, wherein the weight ratio of the anhydrous magnesium dihalide to the hydrous magnesium dihalide is such that the molar ratio of water to magnesium dihalide in said admixture is in the range of 0.5/1 to 2/1.

DETAILED DESCRIPTION OF THE INVENTION

The term "anhydrous" magnesium dihalide as used herein refers to a magnesium dihalide containing less than 0.5 mole of water per mole of magnesium dihalide.

The term "hydrous" magnesium dihalide on the other hand is used herein to refer to those magnesium dihalides having 0.5 mole of water per mole of magnesium dihalide or more. The level of water can be determined using routine analysis techniques. Typically, such techniques involve the use of Karl Fischer titration plus other conventional techniques such as X-ray diffraction and elemental analysis for determining whether there are significant amounts of other materials, particularly MgO, associated with the MgCl$_2$. The presently preferred magnesium dihalide is magnesium dichloride. Although any hydrous dihalide can be employed preferably one is employed which contains more than 2 moles of water per mole of magnesium dihalide. Typical examples of suitable hydrous magnesium dihalides include those of the formula MgCl$_2$.nH$_2$O, wherein n is 1, 2, 4 or 6. The amounts of "hydrous" and "anhydrous" MgCl$_2$ in the admixture can be used to fix the ratio of water to magnesium dihalide in the admixture. A currently preferred mixture is obtained by admixing "anhydrous" MgCl$_2$ and MgCl$_2$.6H$_2$O.

The anhydrous and hydrous magnesium dihalides can be admixed in any suitable manner. One currently preferred technique involves the stirring of the dihalides in a suitable liquid. Preferably the liquid employed would be of a type suitable for use in preparing the catalyst composition. Typical examples include hydrocarbons such as n-pentane, n-heptane, methylcyclohexane, toluene, xylene, and the like that are substantially free of water. The amount of liquid employed is not considered to be particularly critical, however, for practical reasons it is preferred to use enough liquid to provide a readily stirrable mixture.

Coworkers of the present inventors have also recently found that a particularly desirable mixing technique involves ball milling the hydrous and anhydrous magnesium dihalides.

The optimum molar ratio for water to magnesium dihalide in said admixture varies to some degree depending upon the monomer to be polymerized. Typically, a ratio in the range of 0.75/1 to 1.75/1 produces optimum results in polymerization. For propylene optimum results are generally achieved if the ratio is in the range of about 1/1 to about 2/1, more preferably 1/1 to 1.75/1. For ethylene about 0.75/1 to about 1.25/1.

The alkoxytitanium compounds are those titanium compounds in which the titanium is bonded to at least one oxygen atom and the oxygen atom is bonded to at least one alkyl radical. The preferred alkoxytitanium compounds are those of the formula

Ti(OR)$_4$ wherein each R is individually selected from an alkyl group containing 1 to 20 carbon atoms and each R can be the same or different. The most preferred are those in which each alkyl group contains 1 to 10 carbon atoms.

The molar ratio of the alkoxytitanium compound to the metal halide compound can be selected over a relatively broad range. Generally, the molar ratio of alkoxytitanium to magnesium dihalide is in the range of about 10/1 to 1/10, more preferably about 2/1 to 1/2.

The term benzoic acid ester is used generically to include substituted as well as unsubstituted benzoic acid esters. Typical examples include ethyl benzoate, ethyl p-methoxybenzoate, ethyl toluate, ethyl p-butoxybenzoate, and butyl benzoate. The preferred benzoic acid esters are those having 8 to 12 carbon atoms per molecule.

In an especially preferred embodiment, a phenol is employed in conjunction with the benzoic acid ester in making the first catalyst component. The term "phenol" is used herein to refer to substituted as well as unsubstituted phenols. Typical examples include phenol, o-methyl phenol, m-methyl phenol, p-methyl phenol, 4-phenyl phenol, o-fluorophenol, m-fluorophenol, p-fluorophenol, p-sec-butyl phenol, p-ethyl phenol, p-isopropyl phenol, p-terbutyl phenol, p-methoxy phenol, p-cyanophenol, and p-nitrophenol.

The currently preferred combination of ester and phenol is 4-phenyl phenol and ethyl benzoate. The total number of moles of 4-phenyl phenol and ethyl benzoate employed can affect the activity and selectivity of the resulting catalyst. Typically, the ratio of the sum of the moles of those two electron donors to the moles of the titanium alkoxide are in the range of about 5/1 to 1/5, more preferably 3/1 to 2/1. Most preferably, ½ mole of ethyl benzoate is employed per mole of titanium alkoxide.

The formation of the first catalyst component is conducted by reacting the resulting hydrated magnesium dihalide with the titanium compound and a benzoic acid ester, and optionally and preferably with a phenol. The reaction is conducted in a suitable hydrocarbon solvent or diluent substantially free of free water. Examples include n-pentane, n-heptane, methylcyclohexane, toluene, xylenes, and the like. The amount of solvent or diluent can be selected over a broad range. Usually the amount of solvent or diluent would be within the range of about 20 to about 100 cc per gram of metal dihalide.

Generally, it is preferred to combine the hydrated magnesium dihalide and the titanium compound at a temperature in the range of about 0° C. to about 50° C., more preferably about 10° C. to about 30° C. The reaction between the reactants of the first catalyst component is carried out at a temperature in the range of about 15° C. to about 150° C. Typically, the reaction is carried out by refluxing the mixture.

While it is not absolutely critical, it is currently preferred to mix the magnesium dihalide and the titanium compound and optionally the phenol at a temperature in the range of 20° C. to 40° C., then to heat the mixture to 90°–100° C. for a few minutes, and then to add the ester at that temperature and maintain the mixture at a temperature of about 90°–100° C. to complete the reaction.

Generally, the time required for heating the reactants to make the first catalyst component is within the range of about 5 minutes to about 10 hours, although in most instances a time within the range of about 15 minutes to 3 hours is sufficient.

The reaction of the organoaluminum halide with the first catalyst component can be carried out by merely adding the organoaluminum halide to a solution of the first component. It is, however, currently preferred to add a hydrocarbon solution of the halide to the first component solution.

The temperature employed for reacting the second catalyst component, i.e., the organoaluminum halide, and the first catalyst component can be selected over a broad range. Generally, the temperature employed is within a range of aboiut 0° C. to about 50° C. or higher, while temperatures within the range of 20° C. to about 30° C. were most often employed. Since heat is evolved when the first catalyst component and the second catalyst component are mixed, the mixing rate is adjusted as required and additional cooling is employed in order to maintain a relatively constant mixing temperature. It is noted with respect to mixing the first and second components that the order of addition is not important and either component can be added to the other. However, it is preferable to add the second component to the first. After completing the mixing, the resulting slurry is stirred or agitated for a sufficient time, generally within a range of about 15 minutes to about 5 hours to insure that mixing of the components is complete. Thereafter, stirring is discontinued and the solid product recovered by filtration, decantation, and the like. The product is then washed with a suitable material such as a hydrocarbon, e.g., n-pentane, n-heptane, cyclohexane, benzene, xylenes, and the like, to remove any soluble material which may be present. The product is then dried and stored under dry nitrogen.

The molar ratio of the transition metal compound of the first catalyst component to the second catalyst component can be selected over a relatively broad range. Generally, the molar ratio of the transition metal of the first catalyst component to the second catalyst component is within a range of from about 10:1 to about 1:10 and more generally within a range of about 2:1 to about 1:3 since a molar ratio within the latter range usually produces a catalyst which can be employed as an especially active olefin polymerization catalyst.

Generally, the reaction between solid product resulting from the reaction of the first and second components with the halide ion exchanging source can be carried out neat or in a liquid medium in which the halide ion exchanging source is soluble. The product from step (2) is generally in a liquid diluent when contacted with the halide ion exchanging source. Any suitable diluent can be employed. Examples include normally liquid hydrocarbon such as n-pentane, n-heptane, cyclohexane, benzene, and xylene.

The temperature employed in step (3) can be selected over a relatively broad range, generally in the range of −25° C. to +250° C., preferably 0° C. to 200° C., with temperatures of 100° C. being most preferred.

The treating time can also be selected over a broad range and generally is within the range of about 10 minutes to about 10 hours. While the weight ratio of the halide ion exchanging source to the product of step (2) can be selected over a realtively broad range, the weight ratio of the halide ion exchanging source to the product of step (2) is generally within a range of about 10:1 to about 1:10 and more generally from about 7:1 to about 1:4. Following the treatment of the product of step (2) with the halide ion exchanging source the surplus halide ion exchanging source is removed by washing the solid catalyst with a dry (essential absence of water) liquid such as a hydrocarbon of the type previously disclosed, n-hexane, or xylene, for example. The resulting catalyst, after drying, is stored under dry nitrogen.

The currently preferred titanium halide for use as the halide ion exchanging source is $TiCl_4$. In an especially preferred embodiment, the $TiCl_4$ is employed in conjunction with a halide of silicon such as $HSiCl_3$ and/or $SiCl_4$.

The catalyst of the present invention can be used in the polymerization of olefins. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. The mono-1-olefins can be polymerized according to the present invention employing either a particle form process, a gas phase process, or a solution form process. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from about 8 to about 14 carbon atoms per molecule, and include, for example, styrene and various alkylstyrenes, such as 4-ethylstyrene and such as 1-vinylnaphthalene.

The weight percent of the conjugated diolefin in the copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing stereoregular polypropylene, many offering potential for high rates as well as low soluble polymer formation.

Polymerization may be conducted in a liquid phase, in the presence or absence of an inert hydrocarbon diluent, or in a gas phase. In the polymerization of propylene, particularly satisfactory results have been attained operating in the presence of an aliphatic or aromatic hydrocarbon diluent, liquid under the polymerization conditions, such as propylene, toluene, gasoline, and the like.

While it may not be necessary in all instances to employ a cocatalyst with the catalyst of the present invention, the use of cocatalysts is recommended for best results. The organometallic cocatalysts suitable for use in accordance with the invention can be selected from among the hydrides and organometallic compounds of metals of Groups IA, II and IIIA of the Periodic Table. Of the organometallic cocatalysts, organoaluminum compounds such as those described above as suitable for use as the second component of the catalyst, are preferred with the most preferred organoaluminum cocatalysts being compounds of the formula $R_3Al$ which include, for example, trimethylaluminum, triethylaluminum, triisopropylaluminum, tridecylaluminum, trieicosylaluminum, tricyclohexylaluminum, triphenylaluminum, 2-methylpentyldiethylaluminum, and triisoprenylaluminum. Triethylaluminum is preferred since this compound produced excellent results in the runs hereafter described.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 1:1 to about 1500:1. For catalyst systems wherein the cocatalyst comprises at least one organoaluminum compound typically there is employed about 0.25 to 15 milligrams of the titanium-containing component per mmole of organoaluminum cocatalyst.

The catalyst is preferably used with a multicomponent cocatalyst system comprising triethylaluminum (TEA), an aromatic ester such as ethyl anisate (EA), ethyl benzoate (EB), methyl-p-toluate (MPT), etc., and diethylaluminum chloride. Best selectivity (stereospecificity) is obtained when the TEA:ester mole ratio is about 2:1. The DEAC, when used, helps in increasing activity. Generally, a TEA:ester:DEAC mole ratio ranging from about 2:1:0.5-3 and preferably about 2:1:2 is employed in bench scale testing for batch polymerization. For a continuous, larger scale process, it becomes possible, for example, when using TEA and MPT to use TEA:MPT mole ratios of about 3:1 to about 5:1 and dispense with the DEAC entirely. A decreased DEAC level is desirable when employing a flash process to recover polymer since the amount of chloride remaining in the polymer is dependent to some extent on the DEAC level.

The polymerization process according to the present invention employing the catalysts and cocatalysts as above described can be performed either batchwise or continuously. In a batch process, for example, a stirred autoclave is prepared by first purging with nitrogen and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing ethylene, for example, is, for best results, generally within a range of about 50° C. to about 120° C. and the monomer is then admitted and maintained at a partial pressure within a range of about 0.5 MPa to about 5.0 MPa (70–725 psig) for best results. At the end of the designated reaction period, the polymerization reaction is terminated and the unreacted olefin and isobutane are vented. The reactor is opened and the polymer, such as polyethylene, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

For optimum productivity of polymer of low solubility in the continuous polymerization of propylene preferably the cocatalyst comprising the trialkylaluminum-electron donor is contacted with the titanium-containing catalyst prior to being exposed to liquid propylene.

The olefin polymers made with the catalysts of this invention are useful in preparing articles by conventional polyolefin processing techniques such as injection molding, rotational molding, extrusion of film, and the like.

A further understanding of the present invention and its advantages will be provided by the following examples.

EXAMPLE I—CATALYST PREPARATIONS

General procedure

In each preparation, the catalyst components were charged to separate 1 quart (0.95 L) glass beverage bottles containing a magnetic stirring bar in a dry box containing an argon atmosphere. Each bottle was capped, removed from the dry box and heated with stirring as detailed later. The bottle and contents were cooled to about room temperature (23° C.), diluted with dry xylene, and treated dropwise with a 25 weight percent solution of ethylaluminum sesquichloride (EASC) in n-heptane to yield a precipitate. The bottle was returned to the dry box where the solids were isolated by centrifugation, washed by slurrying them and re-centrifugation. This was repeated several times until the supernatant liquid was colorless or nearly so, e.g. 3-4 times. The solids were then dried by standing overnight in the dry box.

A portion of each solid was then slurried with the halide ion exchange agent employed in a beverage bottle in the dry box, the bottle was capped, removed from the box and heated with stirring at 100° C. for the designated time. The bottle and contents were cooled to about 23° C. and returned to the dry box. The resulting solids were recovered by vacuum filtration, washed with n-hexane and dried by standing overnight in the dry box.

Specific examples

Comparison catalyst A: The bottle was charged with 19.05 g of unground $MgCl_2.6H_2O$ which corresponds to a calculated anhydrous $MgCl_2$ of 8.95 g (0.094 mole), 35.8 mL (0.105 mole) of titanium tetra-n-butoxide ($Ti(OBu)_4$), 17.9 g (0.105 mole) of 4-phenylphenol and 15.0 g (0.1 mole) of ethyl benzoate. The mixture was heated for 1 hour at 100° C., cooled to about 23° C. and treated dropwise with 25 mL (0.089 mole) of the EASC solution. The resulting precipitate was isolated, washed and dried to yield 15.0 g of a yellow-orange solid. 5.0 g of the yellow-orange solid was slurried in a mixture consisting of 50 mL (0.45 mole) of titanium tetrachloride, 10 mL (0.09 mole) of silicon tetrachloride and 40 mL (0.4 mole) of trichlorosilane. On a weight (mole) basis, $TiCl_4$ constituted 56 weight percent (48 mole%), $HSiCl_3$ constituted 35 weight % (43 mole %) and $SiCl_4$ constituted 10 weight % (9.6 mole %). The mixture was heated for 1 hour at 100° C. and the solids isolated, washed and dried as described before yielding 4.9. g of a brown solid.

Comparison catalyst B-1,2 was prepared in duplicate preparations. Each bottle was charged with 150 mL of xylene and 19.8 g of $MgCl_2$ containing 0.5 weight percent water as found by analysis. The composition corresponds to $MgCl_2.0.03H_2O$. On a dry basis, the $MgCl_2$ used amounted to about 19.7 g (0.21 mole). After stirring overnight at 23° C., each bottle was additionally charged with 25 g (0.15 mole) of 4-phenylphenol and 0.105 mole of $Ti(OBu)_4$. The reaction mixture was at 100° C. for 15 minutes, 7.5 mL (0.1 mole) of ethyl benzoate (EB) was added and the mixture was heated an additional 45 minutes at 100° C. After cooling, each reaction mixture was treated dropwise with 125 mL (0.39 mole) of the EASC solution. The resulting precipitate was isolated, washed and dried to yield a yellow solid which weighed 34.7 g in preparation B-1 and 38.2 g in duplicate preparation B-2. 20.0 g of each solid was slurried with sufficient mixture formed from 360 mL (3.28 moles) of $TiCl_4$, 270 mL (2.68 moles) of $HSiCl_3$ and 90 mL (1.19 mole) of $SiCl_4$ to provide a readily stirrable mixture (about 100 mL) and the mixture heated for 1 hour at 100° C. On a weight basis (mole) basis, $TiCl_4$ constituted 56 weight percent (46 mole %), $HSiCl_3$ constituted 32 weight % (37 mole %) and $SiCl_4$ constituted 12 weight % (17 mole %). The solids were isolated, washed and dried to yield a light purpose solid weighing 17.1 g for preparation B-1 and 17.4 g for duplicate preparation B-2.

Invention Catalyst C: The catalyst was prepared exactly as described for comparison catalysts B-1, B-2 with the exception that 22.6 g of $MgCl_2$ admixture was charged to the bottle. The admixture was prepared in a one quart (0.9 L) Extra Heavy Duty Waring Blender at about 2300 RPM for 5 minutes by charging the blender with 79.0 g of $MgCl_2.0.08H_2O$ and 35.0 g of $MgCl_2.6H_2O$ to form a calculated composition which can be empirically described as $MgCl_2.1.1H_2O$. Such a composition contains 82.8 weight percent $MgCl_2$ and 17.2 weight percent water. Thus, 22.6 g of $MgCl_2.1.1H_2O$ is equivalent to $22.6 \times 0.828$ which gives 18.7 g equivalent of anhydrous $MgCl_2$ (0.20 mole). Powder X-ray diffraction spectra of the solids resulting from such a mixing reveal peaks characteristic of peaks present in the ASTM reference cards for $MgCl_2$, $MgCl_2.2H_2O$, and $MgCl_2.4H_2O$. The powder specimens for the XRD analysis were loaded onto aluminum holders and covered with Mylar film to exclude moisture and air. A Philips XRG 3100 XRD apparatus was employed having a variable divergent slit, a 0.005 mm receiving slit, and a graphite monochromometer using $CuK\alpha$ a rays produced by a 40 KV, 25 mA generator.

In part 1 of the catalyst preparation, 32.2 g of a burnt-orange colored solid was isolated. In part 2 of the preparation, 20.0 g of the orange solid was contacted with a sufficient quantity of the $TiCl_4$—$HSiCl_3$—$SiCl_4$ mixture to form a stirrable mixture as for catalyst B-1, B2, yielding after recovery 18.2 g of a purple solid.

EXAMPLE II—PROPYLENE POLYMERIZATION

A sample of each catalyst was tested in propylene polymerization for 1 hour at 70° C. by employing a liquid full 1 liter stirred stainless steel reactor in the presence of 2.0 mmoles triethylaluminum (TEA) with 1.1 mmoles ethyl anisate (EA), premixed and 2.0 mmoles diethylaluminum chloride (DEAC) as cocatalyst system and hydrogen.

Before each run the reactor was conditioned by filling it about ½ full with n-hexane dried with alumina and then heating it for about 10 minutes at over 100° C., e.g. 135° C. while stirring. Heating and stirring were discontinued, the reactor contents were dumped, the reactor flushed with dry nitrogen and then purged with propylene vapor. While continuing the propylene purge, the catalyst system was charged to the reactor through an entry port in the following order: TEA.EA mixture, solid catalyst and DEAC. The 3 component cocatalyst system, in terms of moles, can be expressed approximately as TEA:EA:DEAC as 2:1:2.

The port was then sealed and the propylene purge discontinued. The reactor was then filled aobut ⅔ full with liquid propylene and 10 psi hydrogen added (measured as a 10 psi pressure drop from a pressurized, 325 mL container of hydrogen). Heating was started and after reaching a reactor temperature of 70° C. the reactor was filled liquid full with propylene and maintained liquid full during the run by means of a propylene reservoir open to the reactor pressured with dry nitrogen, e.g. about 515 psia (3.55 MPa).

Each run was terminated by discontinuing heating, cooling the reactor below about 60° C., discontinuing stirring and venting unreacted propylene through a dip tube containing a porous end into a dry, tared container. The reactor was then filled with fresh propylene and contents mixed by stirring for several minutes to wash the polymer. The wash propylene was then discharged to the tared container.

The polymer in the reactor was then recovered, dried to remove any excess propylene and weighed to determine the yield. The polymer was slurried in an acetone solution containing a conventional antioxidant system for polypropylene and the solvent removed by heating the mixture for about 3 hours at 60° C. in a vacuum oven.

Propylene soluble polymer contained in the propylene in the tared vessel was determined by heating the vessel to dryness in a vacuum oven at 60° C. The vessel was weighed and the weight of residue remaining was then determined. Xylene soluble polymer and calculated productivity of the solid catalyst were determined as described in the aforementioned U.S. Appl. Ser. No. 240,533, now U.S. Pat. No. 4,394,291.

The amount of each solid catalyst used and the results obtained are set forth in Table I.

TABLE I

PROPYLENE POLYMERIZATION

| Run No. | Catalyst No. | Wt. mg. | Polymer Yield, g | Total polymer[a] | Productivity g/g/hr[b] Propylene Insoluble Polymer | Solubles, Wt. % | | |
|---|---|---|---|---|---|---|---|---|
| | | | | | | Propylene | Xylene | Total |
| 1 | A | 18.3 | 26.8 | 1460 | 1220 | 16.4 | 10.8 | 27.2 |
| 2 | B-1 | 25.2 | 58.7 | 2330 | 2270 | 2.4 | 2.3 | 4.7 |
| 3 | B-2 | 19.6 | 46.2 | 2360 | 2280 | 3.3 | 3.5 | 6.8 |
| 4 | C[c] | 3.0 | 53.0 | 17,700 | 17,200 | 1.4 | 2.7 | 5.3 |

NOTES
[a]Total polymer is polymer recovered from reactor plus propylene soluble polymer.
[b]Calculated productivity as g polymer per g solid catalyst.
[c]Invention catalyst.

The results in run 4 of Table I show that a very active polymerization catalyst can be produced from a physical blend of $MgCl_2$ and $MgCl_2.6H_2O$ which approximates the empirical formula $MgCl_2.1.1H_2O$. The catalyst produces about 17.2 kg of propylene insoluble polypropylene per g solid catalyst per hour at 70° C. in the presence of 10 psi hydrogen using conditions more exactly described in the example.

Control run 1 results, the catalyst formed with $MgCl_2.6H_2O$, gave high total solubles (27.2 weight percent) and low productivity of aobut 1.2 kg propylene insoluble polypropylene per g solid catalyst.

Control runs 2, 3, the catalyst formed with essentially anhydrous $MgCl_2$, show about double the productivity of control run 1 but did produce low total solubles ranging from about 5 to 7 weight percent.

What is claimed is:

1. A process for preparing a catalyst for the polymerization of olefins comprising reacting at admixture of anhydrous magnesium dihalide and hydrous magnesium dihalide with reactants comprising a benzoic acid ester and an alkoxytitanium compound to form a first catalyst component and then reacting said first catalyst component with an organoaluminum halide to form a solid product, and then reacting that solid product with a halogenating agent comprising a titanium halide, wherein said admixture is prepared by stirring anhydrous and hydrous magnesium dihalide together in a suitable liquid and wherein the weight ratio of the anhydrous magnesium dihalide to the hydrous magnesium dihalide in said admixture is such that the molar ratio of water to magnesium dihalide in said admixture is in the range of 0.5/1 to 2/1.

2. A process according to claim 1 wherein said magnesium dihalide comprises magnesium dichloride, said alkoxytitanium compound comprises a compound of the formula $Ti(OR)_4$ wherein each R is individually selected from alkyl groups containing 1 to 20 carbon atoms, and wherein said organoaluminum halide comprises ethyl aluminum sesquichloride.

3. A process according to claim 2 wherein a phenol is also employed as a reactant in the production of said first catalyst component.

4. A process according to claim 3 wherein said admixture is produced by stirring anhydrous magnesium dichloride and hydrous magnesium dichloride having about 6 moles of water for each mole of $MgCl_2$ in a hydrocarbon liquid.

5. A process according to claim 4 wherein said admixture comprises $MgCl_2$, $MgCl_2.2H_2O$, and $MgCl_2.4H_2O$.

6. A process according to claim 5 wherein the molar ratio of water to magnesium halide in said admixture is in the range of 0.75/1 to 1.75/1.

7. A process according to claim 6 wherein the molar ratio of water to magnesium halide in said admixture is about 1/1.

8. A process according to claim 7 wherein a phenol is also employed as a reactant in the production of said first catalyst component.

9. A process according to claim 8 wherein said ester comprises ethyl benzoate and said phenol comprises 4-phenylphenol.

10. A process according to claim 9 wherein said halogenating agent comprises titanium tetrachloride, $HSiCl_3$, and $SiCl_4$.

11. A process according to claim 10 wherein the respective molar ratios of $TiCl_4$, $HSiCl_3$, and $SiCl_4$ is about 4/3.3/1.

12. A process according to claim 3 wherein the molar ratio of the alkoxytitanium compound to the magnesium didhalide is in the range of 10/1 to 1/10, the ratio of the sum of the moles of the benzoic acid ester and the phenol to the moles of alkoxytitanium compound being in the range of 5/1 to 1/5, the molar ratio of the alkoxytitanium compound to the ethylaluminum sesquichloride is in the range of 10/1 to 1/10.

13. A process according to claim 12 wherein the admixture and the alkoxytitanium compound are combined at a temperature in the range of 0° C. to 50° C. and the reaction between the reactants of the first catalyst component is carried out at a temperature in the range of 15° C. to 150° C. for 5 minutes to 10 hours, and the reaction of the organoaluminum halide with the first catalyst component is carried out by adding the organoaluminum halide to a solution of the first component and reacting at a temperature in the range of 0° C. to 50° C., recovering the resulting solid, washing the solid with hydrocarbon and then reacting the solid with the halide ion exchanging source at a temperature in the range of −25° C. to +250° C. with the weight ratio of the halide ion exchanging source to the solid being in the range of 10:1 to 1:10, and then washing the solid free of surplus halide ion exchanging source with a dry liquid.

14. A process according to claim 2 wherein said liquid is a hydrocarbon.

* * * * *